United States Patent
Bartlett et al.

(10) Patent No.: US 12,278,526 B2
(45) Date of Patent: *Apr. 15, 2025

(54) MOTOR CONTROL FOR GAS ENGINE REPLACEMENT DEVICE BASED ON BATTERY PACK CONFIGURATION DATA

(71) Applicant: MILWAUKEE ELECTRIC TOOL CORPORATION, Brookfield, WI (US)

(72) Inventors: Timothy J. Bartlett, Waukesha, WI (US); Ryan B. Jipp, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,252

(22) Filed: Nov. 2, 2023

(65) Prior Publication Data

US 2024/0063694 A1    Feb. 22, 2024

Related U.S. Application Data

(63) Continuation of application No. 17/117,398, filed on Dec. 10, 2020, now Pat. No. 11,811,275.

(Continued)

(51) Int. Cl.
*H02P 1/00* (2006.01)
*H02J 7/00* (2006.01)
(Continued)

(52) U.S. Cl.
CPC ............ *H02K 11/33* (2016.01); *H02J 7/0063* (2013.01); *H02K 5/00* (2013.01); *H02K 7/003* (2013.01);
(Continued)

(58) Field of Classification Search
CPC .................................. H02K 11/33; H02P 6/30
See application file for complete search history.

(56) References Cited

U.S. PATENT DOCUMENTS

| 5,149,225 A | 9/1992 | Artzberger |
|---|---|---|
| 5,387,052 A | 2/1995 | Artzberger |

(Continued)

FOREIGN PATENT DOCUMENTS

| CN | 205188931 U | 4/2016 |
|---|---|---|
| CN | 206274616 U | 6/2017 |

(Continued)

OTHER PUBLICATIONS

International Search Report and Written Opinion for Application No. PCT/US2020/064169 dated Apr. 8, 2021 (10 pages).

(Continued)

*Primary Examiner* — Karen Masih
(74) *Attorney, Agent, or Firm* — Michael Best & Friedrich LLP

(57) ABSTRACT

A gas engine replacement device includes a housing, a battery receptacle coupled to the housing and configured to removably connect to a battery pack having a memory storing battery pack configuration data, a motor located within the housing, a power take-off shaft receiving torque from the motor and protruding from a side of the housing, a power switching network configured to selectively provide power from the battery pack to the motor, and a first electronic processor coupled to the power switching network and configured to control the power switching network to rotate the motor. The first electronic processor is configured to receive the battery pack configuration data responsive to a connection of the battery pack to the battery receptacle and control the power switching network based on the battery pack configuration data.

20 Claims, 8 Drawing Sheets

Related U.S. Application Data

(60) Provisional application No. 62/946,226, filed on Dec. 10, 2019.

(51) Int. Cl.
  *H02K 5/00* (2006.01)
  *H02K 7/00* (2006.01)
  *H02K 11/33* (2016.01)
  *H01M 10/42* (2006.01)

(52) U.S. Cl.
  CPC .............. *H01M 2010/4271* (2013.01); *H01M 2010/4278* (2013.01); *H01M 2220/20* (2013.01); *H01M 2220/30* (2013.01)

(56) References Cited

U.S. PATENT DOCUMENTS

| | | | |
|---|---|---|---|
| 7,872,374 B2 * | 1/2011 | Gottlieb | ................ H02J 7/0013 307/66 |
| 9,154,009 B2 | 10/2015 | Alemu | |
| 2011/0093840 A1 | 4/2011 | Pynenburg et al. | |
| 2012/0292068 A1 | 11/2012 | Velderman et al. | |
| 2017/0120435 A1 | 5/2017 | Palich et al. | |
| 2017/0271949 A1 | 9/2017 | Mergener et al. | |
| 2018/0138839 A1 | 5/2018 | Puzio et al. | |
| 2019/0006980 A1 | 1/2019 | Sheeks et al. | |
| 2020/0001446 A1 | 1/2020 | Ballard et al. | |
| 2020/0076337 A1 | 3/2020 | Abbott et al. | |

FOREIGN PATENT DOCUMENTS

| | | |
|---|---|---|
| CN | 107453468 A | 12/2017 |
| EP | 0784800 B1 | 3/2004 |
| EP | 0841208 B1 | 4/2004 |
| EP | 2448083 A2 | 5/2012 |
| JP | 2001240326 A | 9/2001 |
| JP | 2011244724 A | 12/2011 |
| JP | 2012035398 A | 2/2012 |
| JP | 2014148008 A | 8/2014 |
| JP | 2016209997 A | 12/2016 |
| WO | 2018180085 A1 | 10/2018 |

OTHER PUBLICATIONS

Japanese Patent Office Action for Application No. 2022-534676 dated Aug. 8, 2023 (6 pages including statement of relevance).
Japanese Patent Office Action for Application No. 2022-534676 dated Aug. 8, 2023 (11 pages including English translation).
Extended European Search Report for Application No. 20897808.0 dated Feb. 13, 2024 (8 pages).
Japanese Patent Office Action for Application No. 2022-534676 dated Apr. 9, 2024 (7 pages including machine English translation).
Japanese Patent Office Action for Application No. 2022-534676 dated Dec. 5, 2023 (11 pages including machine English translation).

* cited by examiner ered to monitor a condition of the battery pack and communicate revised battery pack configuration data to the second electronic processor responsive to the condition violating a threshold. The second electronic processor is configured to control the electric motor based on the revised battery pack configuration data.
MOTOR CONTROL FOR GAS ENGINE REPLACEMENT DEVICE BASED ON BATTERY PACK CONFIGURATION DATA

RELATED APPLICATIONS

This application is a continuation application of U.S. patent application Ser. No. 17/117,398 filed on Dec. 10, 2020, which claims the benefit of U.S. Provisional Patent Application No. 62/946,226, filed Dec. 10, 2019, the entire content of both of which is hereby incorporated by reference.

FIELD

The present application relates to gas engine replacement motor units and, more particularly, to gas engine replacement motor units for use with power equipment.

BACKGROUND

Currently, several outdoor power equipment (e.g., lawn and garden equipment) and construction equipment (e.g., concrete mixers, plate compactors) include a gas engine to run the power equipment. However, gas engines produce emissions and are not generally adaptable for optimal performance of the power equipment.

SUMMARY

Gas engine replacement devices, also referred to as powerheads, that are powered by lithium-ion battery packs and that use electric brushless motors provide several advantages over gas engines when powering the equipment. However, a battery powered gas engine replacement device may have limited runtime when compared to similar sized gasoline powered engine. The energy density of gasoline is higher than current lithium-ion battery chemistry or other widely available battery technology.

In some embodiments, a gas-engine replacement device is provided including a housing, a battery receptacle coupled to the housing and configured to removably connect to a battery pack having a memory storing battery pack configuration data, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The electronic processor is configured to receive the battery pack configuration data responsive to a connection of the battery pack to the battery receptacle and control the electric motor based on the battery pack configuration data.

In some embodiments, a gas-engine replacement device is provided including a housing, a battery receptacle coupled to the housing and configured to removably connect to a battery pack including a first electronic processor, a motor located within the housing, a power take-off shaft receiving torque from the motor and protruding from a side of the housing, a power switching network configured to selectively provide power from the battery pack to the motor, and a second electronic processor. The first electronic processor is configured to communicate battery pack configuration data to the second electronic processor responsive to a connection of the battery pack to the battery receptacle. The second electronic processor is coupled to the power switching network and configured to control the power switching network to rotate the motor based on the battery pack configuration data. The first electronic processor is config- In some embodiments, a gas-engine replacement device is provided including a housing, a battery receptacle coupled to the housing and configured to removably connect to a battery pack including a first electronic processor, a motor located within the housing, a power take-off shaft receiving torque from the motor and protruding from a side of the housing, a power switching network configured to selectively provide power from the battery pack to the motor, and a second electronic processor. The second electronic processor is coupled to the power switching network and configured to control the power switching network to rotate the motor. One of the first or second electronic processors is configured to detect a connection of the battery pack and, in response, the first electronic processor is configured to communicate battery pack configuration data to the second electronic processor. The second electronic processor is configured to control the electric motor based on the battery pack configuration data.

Before any embodiments are explained in detail, it is to be understood that the embodiments are not limited in its application to the details of construction and the arrangement of components set forth in the following description or illustrated in the following drawings. Embodiments described herein are capable of being practiced in or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in sub-sets, or as alternatives (for example, "A, B, and/or C" means A; B; C; A and B; B and C; A and C; or A, B, and C).

It should be noted that a plurality of hardware and software based devices, as well as a plurality of different structural components may be utilized to implement embodiments described herein. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments.

Other features and aspects will become apparent by consideration of the following detailed description and accompanying drawings.

DETAILED DESCRIPTION

Figure 1:
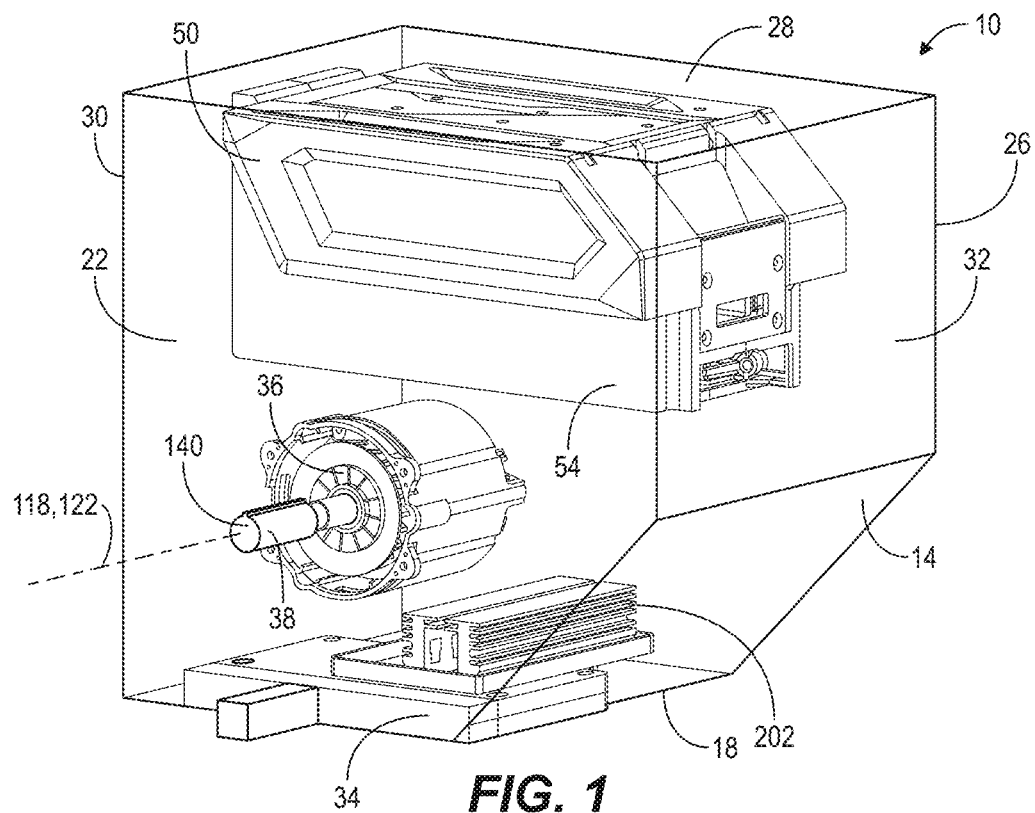
FIG. 1 is a perspective view of a gas engine replacement device in accordance with an embodiment.
Figure 2:
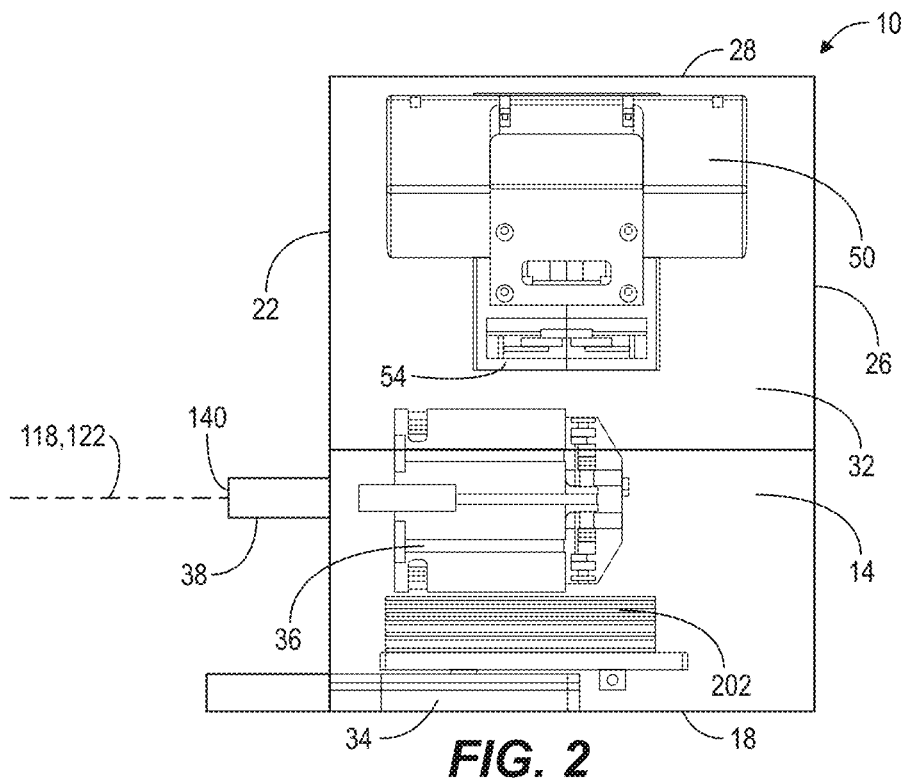
FIG. 2 is a plan view of the gas engine replacement device of FIG. 1.
Figure 3:
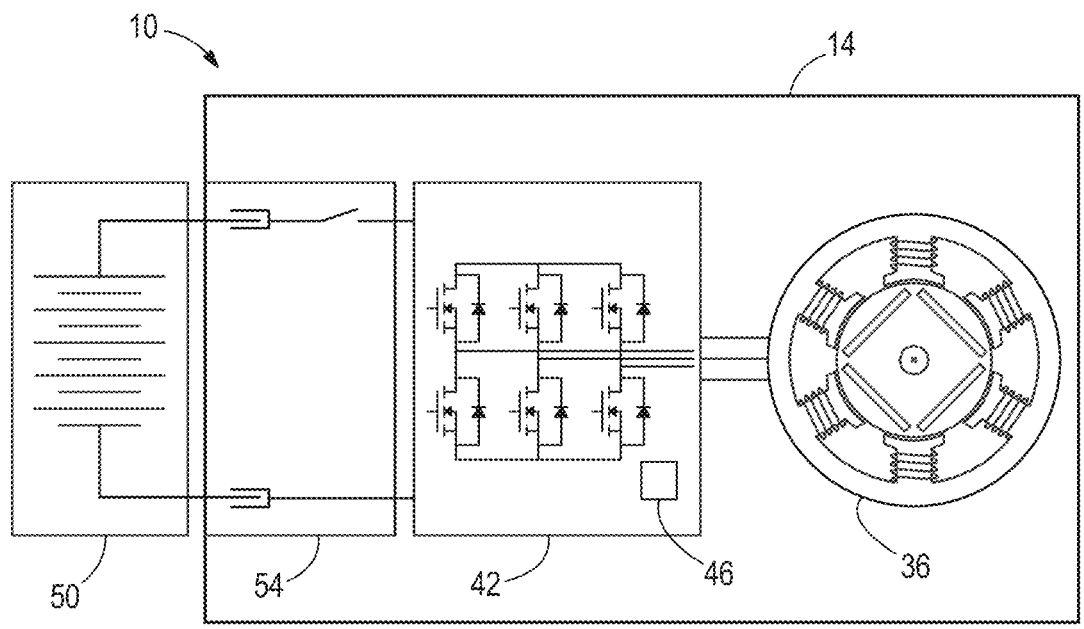
FIG. 3 is a schematic view of the gas engine replacement device of FIG. 1.

As shown in FIGS. 1 and 2, a gas engine replacement device 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The gas engine replacement device 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIG. 3, the gas engine replacement device 10 also includes control electronics 42 positioned within the housing 14 and including wiring and a controller 46 that is electrically connected to the motor 36. A similar gas engine replacement device 10 is described and illustrated in U.S. patent application Ser. No. 16/551,197, filed Aug. 26, 2019, the entire content of which is incorporated herein by reference.

Figure 4:
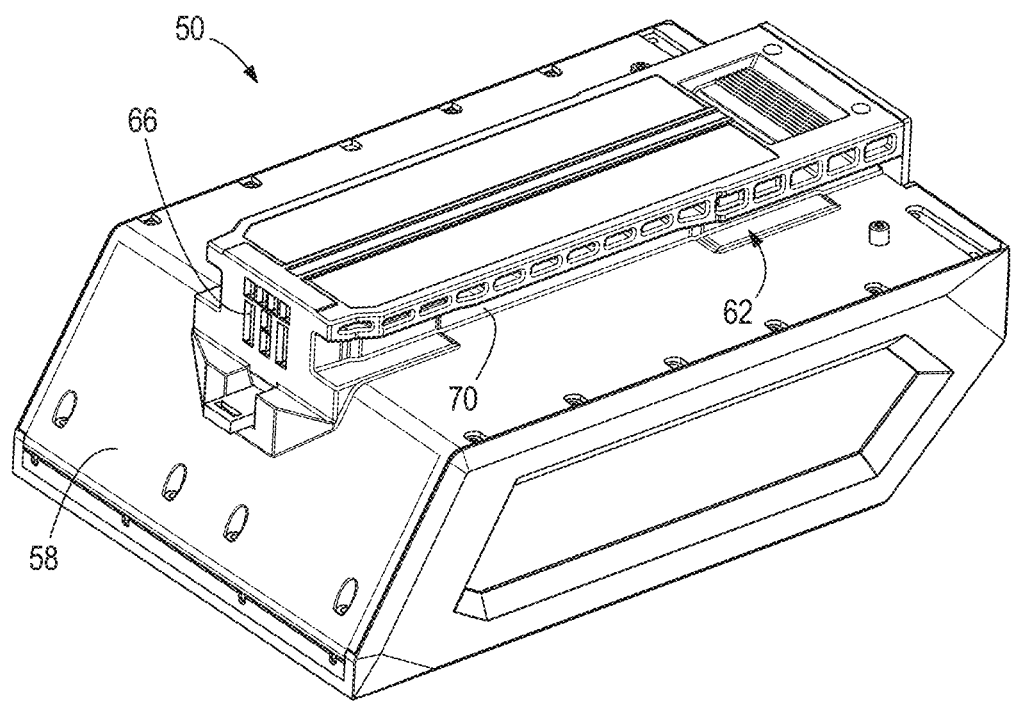
FIG. 4 is a perspective view of a battery pack of the gas engine replacement device of FIG. 1.
Figure 5:
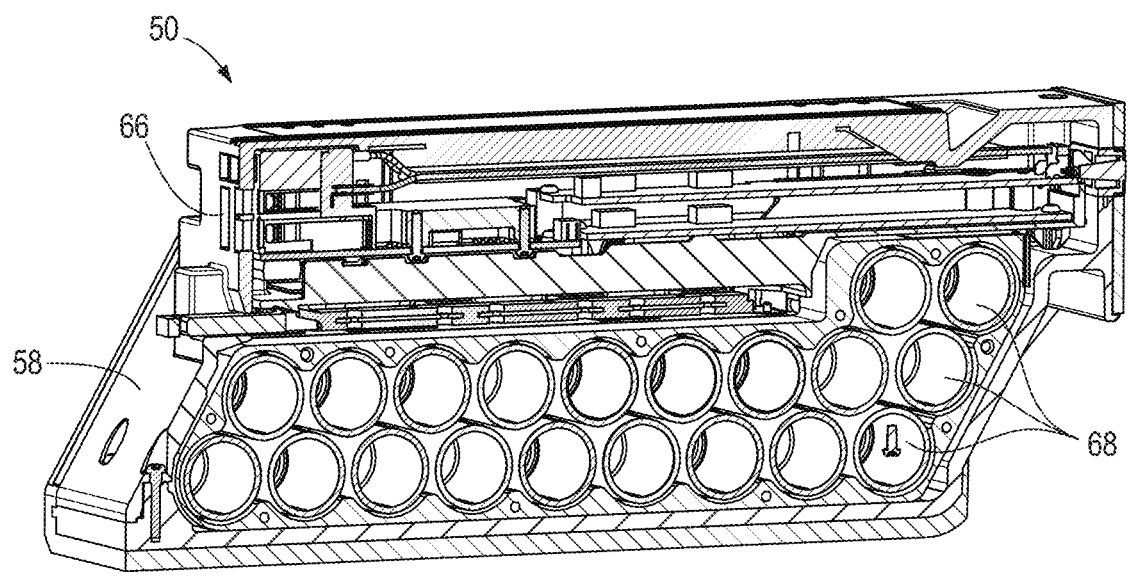
FIG. 5 is a cross-sectional view of the battery pack of FIG. 4.
Figure 6:
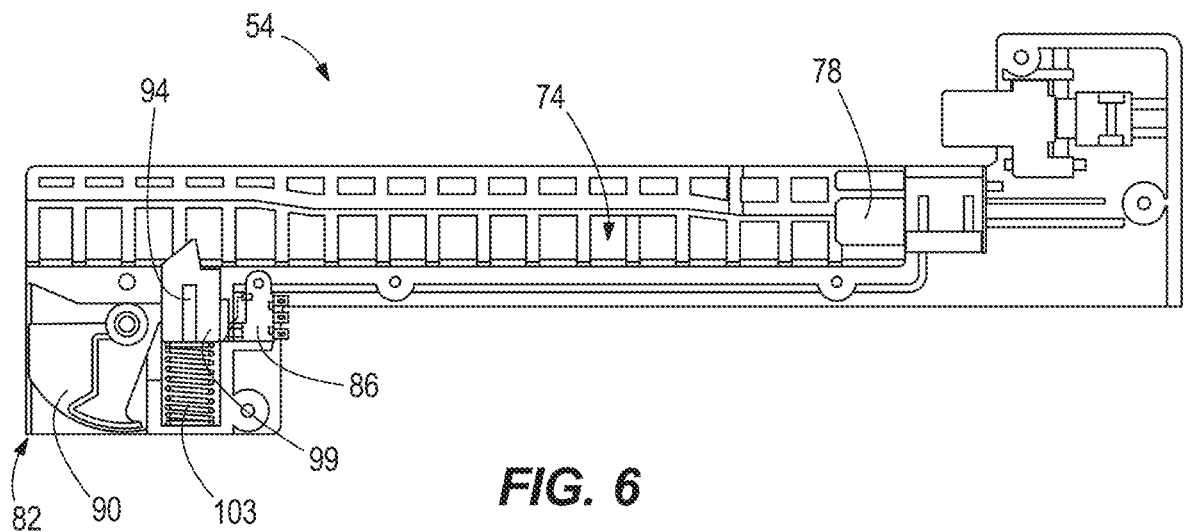
FIG. 6 is a cross-sectional view of a battery receptacle of the gas engine replacement device of FIG. 1.

As shown in FIGS. 1-6, the gas engine replacement device 10 also includes a battery pack 50 that is removably connected to a battery receptacle 54 in the housing 14 to transfer current from the battery pack 50 to the motor 36 via the control electronics 42. In some embodiments, multiple battery packs 50 are connected to multiple battery receptacles 54 in the housing 14. With reference to FIGS. 4-6, the battery pack 50 includes a battery pack housing 58 with a support portion 62 and a first terminal 66 that is electrically connected to a plurality of battery cells 68 supported by the battery pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. Patent Publication No. 2019/0006980 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about: 20 A and 60 A, 20 A and 50 A, 30 A and 50 A, 20 A and 40 A, or 40 A and 60 A. In some embodiments, each of the battery cells 68 has a capacity of between about 3.0 Ah and about 5.0 Ah.

Although various concepts are described herein as they apply to a gas engine replacement device, in some embodiments, these concepts may be applied to other application where a motor is not the load. For example, the load may be a lighting system powered by the battery pack 50.

FIG. 6 illustrates the battery receptacle 54 of the gas engine replacement device 10 in accordance with some embodiments. The battery receptacle 54 includes the projection/recess 74, a second terminal 78, a latching mechanism 82, and a power disconnect switch 86. The projection/recess 74 cooperates with the projection/recess 70 of the battery pack 50 to attach the battery pack 50 to the battery receptacle 54 of the gas engine replacement device 10. When the battery pack 50 is attached to the gas engine replacement device 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the gas engine replacement device 10. In some embodiments, the battery pack receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery pack receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 99 of the battery pack receptacle 54 and is biased toward a latching position by a biasing member 103 (e.g., a spring) to protrude through a surface of the battery receptacle 54 and into a cavity in the battery pack 50.

The latching mechanism also 82 includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the gas engine replacement device 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the gas engine replacement device 10. When the controller 46 receives the interrupt, the controller 46 begins a power down operation to safely power down the control electronics 42 of the gas engine replacement device 10. A similar latching mechanism and disconnect switch is described and illustrated in U.S. Patent Publication No. 2019/0006980, which has been incorporated herein by reference.

Figure 7:
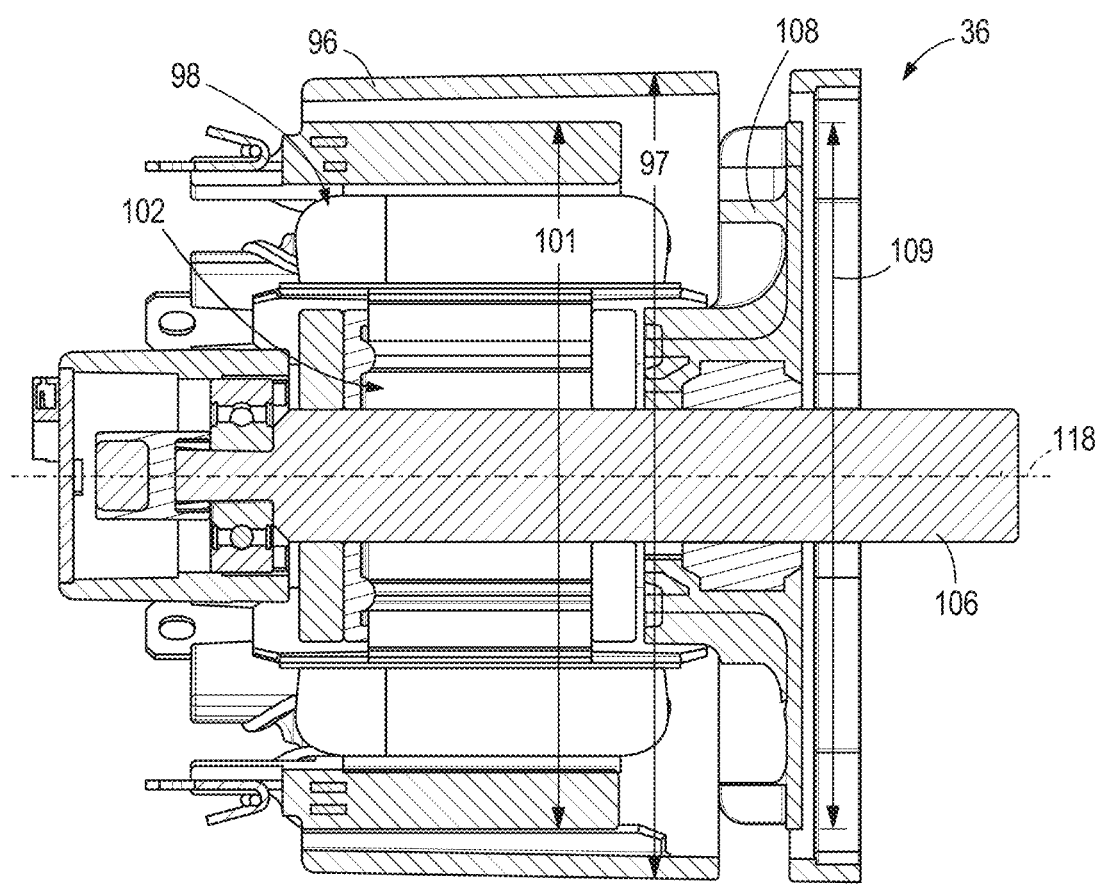
FIG. 7 is a cross-sectional view of a motor of the gas engine replacement device of FIG. 1.

As shown in FIG. 7, the motor 36 includes a motor housing 96 having an outer diameter 97, a stator 98 having a nominal outer diameter 101 of up to about 80 mm, a rotor 102 having an output shaft 106 and supported for rotation within the stator 98, and a fan 108. A similar motor is described and illustrated in U.S. Patent Publication No. 2019/0006980, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger diameter 97 of the motor housing 96. In some embodiments, the motor 36 can be stopped with an electronic clutch (not shown) for quick overload control. In some embodiments, the motor 36 has a volume of up to about 443,619 mm$^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor 36 is an internal rotor motor, but in other embodiments, the motor 36 can be an outer rotor motor with a nominal outer diameter (i.e. the nominal outer diameter of the rotor) of up to about 80 mm. In some embodiments, the motor has a nominal outer diameter above 80 mm, for example, up to 90 mm, 100 mm, 110 mm, 120 mm, or 125 mm.

Figure 8:
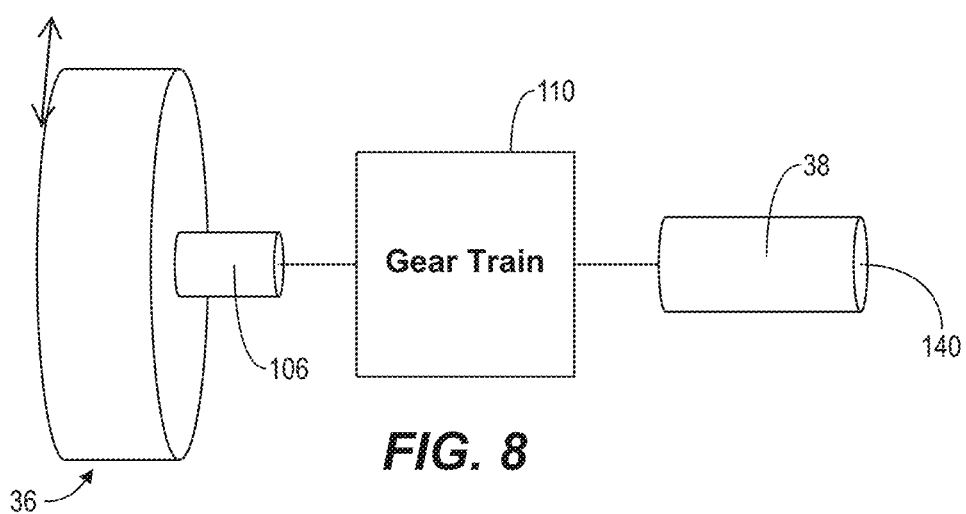
FIG. 8 is a schematic view of a motor, a gear train, and a power take-off shaft of the gas engine replacement device of FIG. 1.

With reference to FIG. 8, the motor 36 can transfer torque to the power take-off shaft 38 in a variety of configurations. In some embodiments, the output shaft 106 is also the power take-off shaft 38, such that the motor 36 directly drives the power take-off shaft 38 without any intermediate gear train. For example, the motor 36 may be a direct drive high pole count motor. As shown in FIG. 8, in other embodiments, the gas engine replacement device 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In some embodiments, the gear train 110 may include a planetary transmission that transfers torque from the output shaft 106 to the power take-off shaft 38, and a rotational axis of the output shaft 106 is coaxial with a rotational axis of the power take-off shaft 38. In some embodiments, the gear train 110 includes a spur gear engaged with the output shaft 106 of the rotor, such that the rotational axis of the output shaft 106 is offset from and parallel to the rotational axis of the power take-off shaft 38. In some embodiments, the gear train 110 includes a bevel gear, such that the rotational axis of the output shaft 106 is perpendicular to the rotational axis of the power take-off shaft 38. In other embodiments utilizing a bevel gear, the rotational axis of the output shaft 106 is not perpendicular, parallel, or coaxial to the rotational axis of the power take-off shaft 38, and the power take-off shaft 38 protrudes from the flange 34.

In some embodiments, the gas engine replacement device 10 includes ON/OFF indicators (not shown). In some embodiments, the gas engine replacement device 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the gas engine replacement device 10 includes a heat sink 202 in the housing 14 for air-cooling the control electronics 42 (FIGS. 1 and 2). In some embodiments, the gas engine replacement device 10 is liquid cooled.

In some embodiments, the output shaft 106 of the rotor 102 has both forward and reverse capability as further described below. In some embodiments, the forward and reverse capability is controllable without shifting gears of the gear train 110, in comparison to gas engines, which cannot achieve forward/reverse capability without extra gearing and time delay. Thus, the gas engine replacement device 10 provides increased speed, lower weight, and lower cost. Because the gas engine replacement device 10 has fewer moving parts and no combustion system, as compared with a gas engine, it also provides additional speed, weight, and cost advantages.

The gas engine replacement device 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the gas engine replacement device 10 does not require gas, oil, or other fluids, it can run, be transported, and be stored upside down or on any given side without leaking or flooding In operation, the gas engine replacement device 10 can be used to replace a gas engine system. Specifically, the gas engine replacement device 10 can be mounted to the piece of power equipment having a second bolt pattern by aligning a first bolt pattern defined by the plurality of apertures in the flange 34 with the second bolt pattern. In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the gas engine replacement device 10 to be coupled to the piece of power equipment.

Alternatively, the gas engine replacement device 10 can be connected to a piece of power equipment using a belt system by providing a belt that operatively connects the power take-off shaft and an equipment bit. Thus, the power take-off shaft 38 of the gas engine replacement device 10 can be used to drive the equipment.

During operation, the housing 14 of the gas engine replacement device 10 is comparably much cooler than the housing of an internal combustion unit because there is no combustion in the gas engine replacement device 10. Specifically, when a gas engine unit runs, the housing of the gas engine unit is 220 degrees Celsius or higher. In contrast, when the gas engine replacement device 10 runs, all of the exterior surfaces of the housing 14 are less than 95 degrees Celsius. Tables 1 and 2 below list with further specificity the temperature limits of different components on the housing 14 of the gas engine replacement device 10.

Table 1 below lists the Underwriter's Laboratories (UL) temperature limits of different components typically used in power tools, with respect to whether those components are formed of metal, plastic, rubber, wood, porcelain, or vitreous. For example, at least in some embodiments, the plastic rated temperatures are never exceeded by the gas engine replacement device 10.

TABLE 1

|  | Metal | Plastic/Rubber/Wood | Porcelain/Vitreous |
|---|---|---|---|
| Casual Contact | 85° C. | 85° C. | 85° C. |
| Handles and knobs that are continuously held | 55° C. | 75° C. | 65° C. |
| Handles and knobs that are only briefly held (i.e. switches) | 60° C. | 80° C. | 70° C. |

Table 2 below lists the UL temperature limits of different components of the battery pack housing 58 of the battery pack 50, with respect to whether those components are formed of metal, plastic or rubber. For example, at least in some embodiments, the plastic rated temperatures are never exceeded by the gas engine replacement device 10.

TABLE 2

|  | Metal | Plastic/Rubber |
|---|---|---|
| Casual Contact | 70° C. | 95° C. |
| Handles and knobs that are continuously held | 55° C. | 75° C. |

TABLE 2-continued

|  | Metal | Plastic/Rubber |
|---|---|---|
| Handles and knobs that are only briefly held (i.e. switches) | 60° C. | 85° C. |

Figure 9:
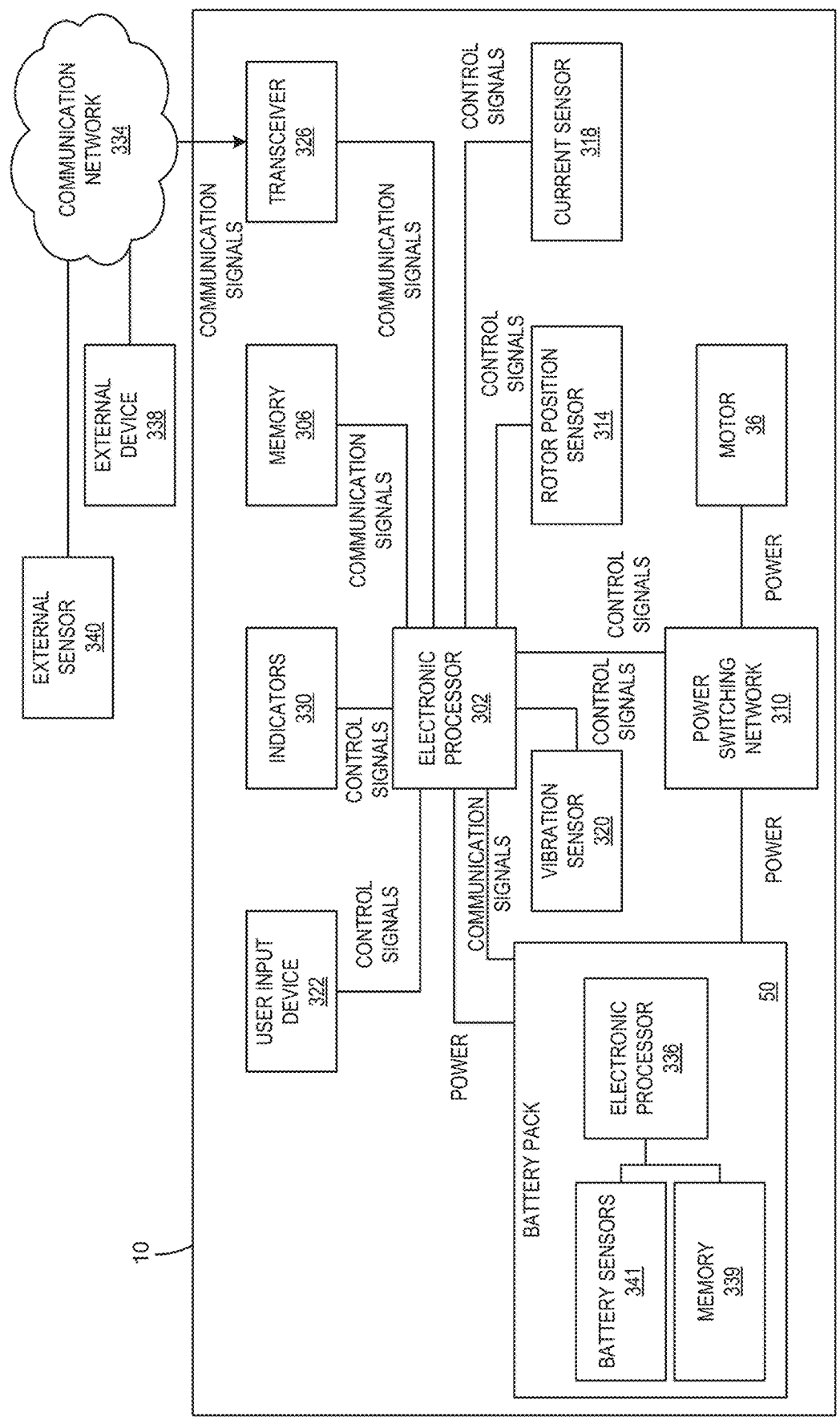
FIG. 9 is a block diagram of the gas engine replacement device of FIG. 1.

FIG. 9 illustrates a simplified block diagram of the gas engine replacement device 10 according to one example embodiment. As shown in FIG. 9, the gas engine replacement device 10 includes an electronic processor 302, a memory 306, the battery pack 50, a power switching network 310, the motor 36, a rotor position sensor 314, a current sensor 318, a user input device 322 (e.g., a throttle, trigger, or power button), a transceiver 326, indicators 330 (e.g., light-emitting diodes), and a vibration sensor 320. In some embodiments, the gas engine replacement device 10 includes fewer or additional components than those shown in FIG. 9. For example, the gas engine replacement device 10 may include a battery pack fuel gauge, work lights, additional sensors, kill switch, the power disconnect switch 86, etc. In some embodiments, elements of the gas engine replacement device 10 illustrated in FIG. 9 including one or more of the electronic processor 302, memory 306, power switching network 310, rotor position sensor 314, current sensor 318, user input device 322, transceiver 326, indicators 330, and vibration sensor 320 form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein.

As described above, in some embodiments, the battery pack 50 is removably connected to the housing of the gas engine replacement device 10 such that a different battery pack 50 may be attached and removed to the gas engine replacement device 10 to provide different amount of power to the gas engine replacement device 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-8.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount in which the user input device 322 is depressed is related to or corresponds to a desired speed of rotation of the motor 36. In other embodiments, the amount in which the user input device 322 is depressed is related to or corresponds to a desired torque. In other embodiments, a separate input device (e.g., slider, dial, or the like) is included on the gas engine replacement device 10 in communication with the electronic processor 302 to provide a desired speed of rotation or torque for the motor 36.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge (see FIG. 10) that receives pulse-width modulated (PWM) signals from the electronic processor 302 to drive the motor 36.

The rotor position sensor 314 and the current sensor 318 are coupled to the electronic processor 302 and communicate to the electronic processor 302 various control signals indicative of different parameters of the gas engine replacement device 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back emf) generated in the motor coils. The electronic processor 302 may determine the rotor position, the rotor speed, and the rotor acceleration based on the back emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direction of desired rotation, and (b) de-energizes the previously energized stator winding pair (or pairs) to prevent application of magnetic forces on the rotor magnets that are opposite the direction of rotation of the rotor.

The current sensor 318 monitors or detects a current level of the motor 36 during operation of the gas engine replacement device 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an external device 338 (e.g., a smart phone, tablet, or laptop computer) over a wired or wireless communication network 334. In some embodiments, the transceiver 326 may comprise separate transmitting and receiving components. In some embodiments, the transceiver 326 may comprise a wireless adapter attached to the gas engine replacement device 10. In some embodiments, the transceiver 326 is a wireless transceiver that encodes information received from the electronic processor 302 into a carrier wireless signal and transmits the encoded wireless signal to the external device 338 over the communication network 334. The transceiver 326 also decodes information from a wireless signal received from the external device 338 over the communication network 334 and provides the decoded information to the electronic processor 302. In some embodiments, the transceiver 326 communicates with one or more external sensors 340 via the communication network 334. For example, an external sensor 340 may be associated with the equipment to which the gas engine replacement device 10 is mounted. In some embodiments, the external sensor 340 is a speed sensor, a position sensor, or the like. In some embodiments, the battery pack 50 includes a transceiver. In some embodiments, the battery pack transceiver communicates wirelessly with the transceiver 326 in the power tool 10 or with the external device 338. In some embodiments, the external device 338 communicates data, such as the battery pack configuration data, to the power tool 10. For example, the transceiver in the battery pack 50 may communicate the battery pack configuration data to the external device 338, and the external device 338 may communicate the battery pack configuration data to the transceiver 326 in the power tool 10.

The communication network 334 provides a wired or wireless connection between the gas engine replacement device 10, the external device 338, and the external sensor 340. The communication network 334 may comprise a short range network, for example, a BLUETOOTH network, a Wi-Fi network or the like, or a long range network, for example, the Internet, a cellular network, or the like.

As shown in FIG. 9, the indicators 330 are also coupled to the electronic processor 302 and receive control signals from the electronic processor 302 to turn on and off or otherwise convey information based on different states of the gas engine replacement device 10. The indicators 330 include, for example, one or more light-emitting diodes ("LEDs"), or a display screen. The indicators 330 can be configured to display conditions of, or information associated with, the gas engine replacement device 10. For example, the indicators 330 are configured to indicate measured electrical characteristics of the gas engine replacement device 10, the status of the gas engine replacement device 10, the mode of the gas engine replacement device 10, etc. The indicators 330 may also include elements to convey information to a user through audible or tactile outputs. In some embodiments, the indicators 330 include an eco-indicator that indicates an amount of power being used by the load during operation.

The connections shown between components of the gas engine replacement device 10 are simplified in FIG. 9. In practice, the wiring of the gas engine replacement device 10 is more complex, as the components of a gas engine replacement device are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the gas engine replacement device 10.

In some embodiments, the battery pack 50 includes an electronic processor 336, a memory 339, and one or more battery sensors 341. The memory 339 includes read only memory (ROM), random access memory (RAM), other non-transitory computer-readable media, or a combination thereof. The electronic processor 336 is configured to communicate with the memory 339 to store data and retrieve stored data. The electronic processor 336 is configured to receive instructions and data from the memory 339 and execute, among other things, the instructions. In particular, the electronic processor 336 executes instructions stored in the memory 339 to perform battery control functions described herein. The battery sensors 341 provide information associated with the battery pack 50, such as temperature, stage of charge, discharge rate, and the like. The sensors 341 may provide the information to the electronic processor 336, which may, for example, store the sensor data in the memory 339, analyze the information and take responsive action, or both. In some embodiments, the memory 339 stores battery configuration data, such as a maximum discharge current, an age parameter (e.g., manufacturer date or number of charge/discharge cycles), and the like. In some embodiments, the battery configuration data can be determined non-digitally, such as by reading or determining a value for capacitance, resistance, inductance, magnetic field strength, etc., associated with the battery pack 50 which can be determined by the gas engine replacement device 10.

The electronic processor 336 in the battery pack 50 communicates with the electronic processor 302 in the gas engine replacement device 10 to exchange configuration data and status data associated with the battery pack 50. In some embodiments, the configuration data includes the maximum discharge current associated with the battery pack. In some embodiments, the electronic processor 336 also communicates status data associated with the battery pack 50 to the electronic processor 302, such as age, state of charge, discharge rate, and the like. The electronic processor 336 in the battery pack 50 may communicate with the electronic processor 302 in the gas engine replacement device through a wired or wireless interface.

The battery pack 50 has a particular arrangement of cells that affects its power supply capabilities. Different cell types can provide different current levels at a recommended operating temperature. For example, a "30T" cell might be able to discharge continuously at 30 A in the battery pack 50 with a certain airflow design that reaches thermal equilibrium at a temperature below the maximum allowed temperature of the battery pack 50. A "40T" cell might only be able to be discharged in a similar design at 25 A. If the gas engine replacement device 10 is optimized for 30 A discharge, it could cause an over-temp condition in the battery pack 50 with a "40T" in a similar use case without discharging all available energy within the cells. If an over-temp condition is reached, the electronic processor 336 in the battery pack 50 would signal a fault condition and interrupt power until the battery pack 50 cooled down to an acceptable temperature before remaining charge in the battery pack 50 could be accessed. Alternatively, if the gas engine replacement device 10 is optimized for a 25 A discharge, the gas engine replacement device 10 would operate at a lower, and potentially less preferred operating load point, which could result in the functions of the gas engine replacement device 10 being completed at a slower rate or less efficiently.

Figure 10:
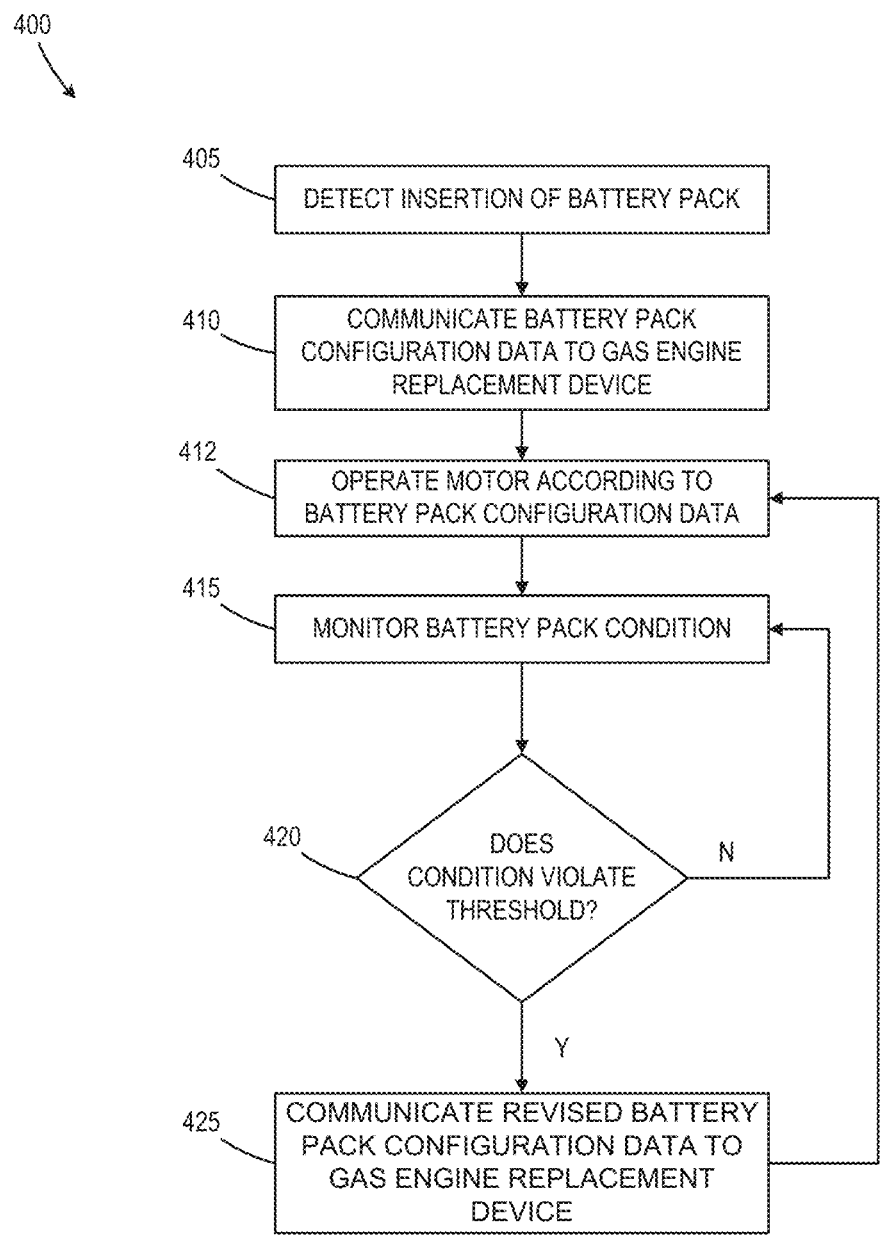
FIG. 10 is a flowchart of an example method for battery pack configuration control in the gas engine replacement device of FIG. 1.

FIG. 10 is a flowchart of an example method 400 for battery pack configuration control in the gas engine replacement device 10 of FIG. 1. Connection or insertion of the battery pack 50 is detected at block 405. In some embodiments, the electronic processor 336 in the battery pack 50 detects the connection of the battery pack 50, while in other embodiments, the electronic processor 302 in the gas engine replacement device 10 detects the connection of the battery pack 50. In some embodiments, connection of the battery pack 50 is detected by the electronic processor 336 or the electronic processor 302 (a) using a wired communication from the other of the electronic processor 336 and the electronic processor 302 or (b) a hardware detection circuit that detects or measures changes in resistance or voltage (e.g., at the terminal 66 or 78) above a certain threshold and provides a signal to the electronic processor 336 or the electronic processor 302.

Battery pack configuration data is communicated to the gas engine replacement device 10 at block 410. In some embodiments, the electronic processor 336 in the battery pack 50 broadcasts the battery pack configuration data responsive to detecting the connection at block 405. In some embodiments, the electronic processor 302 in the gas engine replacement device 10 polls the battery pack 50 to retrieve the battery pack configuration data responsive to detecting the insertion of the battery pack 50 at block 405. In some embodiments, the electronic processor 302 in the gas engine replacement device 10 reads the battery pack configuration data directly from the memory 339 in the battery pack 50. In an embodiment where the electronic processor 302 in the gas engine replacement device 10 reads the battery pack configuration data directly from the memory 339 in the battery pack 50, the electronic processor 336 in the battery pack 50 may be omitted. In some embodiments, one or more of the battery pack configuration data parameters may be measured or inferred. For example, a technique that includes pulsing a current and measuring a voltage drop or resistance in the battery pack 50 in response to the pulse may be employed to measure a battery pack configuration parameter.

Upon receipt, the gas engine replacement device 10 stores the battery pack configuration data in the memory 306. In some embodiments, the battery pack configuration data includes parameters such as cell size, cell maximum temperature, maximum discharge current, minimum operating speed, and the like. The battery pack configuration data may be written to the memory 339 of the battery pack 50 at the time of manufacturing or rewritten during regular service or calibration intervals by a certified service center. In some embodiments, the maximum discharge current represents the maximum current the battery pack 50 can provide until complete discharge with no thermal overload occurring.

In block 412, the electronic processor 302 of the gas engine replacement device 10 operates the motor 36 according to the battery pack configuration data received from the battery pack 50. For example, the electronic processor 302 can control the motor 36 using a motor control algorithm that considers the maximum discharge current to ensure the current drawn from the battery pack 50 does not exceed the specified maximum discharge current. In some embodiments, the current sensor 318 measures a current parameter, such as a motor current, and is employed by the electronic processor 302 to estimate the discharge current. In some embodiments, the current sensor 318 directly monitors current drawn from the battery pack 50 as the current parameter. In some embodiments, the battery sensor 341 measures the battery current as the current parameter. In some embodiments, the motor current is measured indirectly by measuring motor back emf signals, such as from the output of the rotor position sensor 314, or by measuring voltage drops across the motor 36.

In some embodiments, the electronic processor 302 may initialize the motor control algorithm by operating the motor at 100% PWM (i.e., controlling switches of the power switching network 310 using control signals having 100% PWM duty cycle) while monitoring the current drawn from the battery pack 50 compared to the maximum discharge current specified in the battery pack configuration data. If the current from the battery pack 50 reaches the maximum discharge current, the electronic processor 302 can reduce the PWM parameter, reducing the current being consumed compared to 100% PWM operation. The electronic processor 302 can continue to lower the PWM parameter until a minimum device operation setting, or 0% PWM was reached. In this manner, the electronic processor 302 can generate an operating curve that relates the PWM parameter to current draw under the current ambient environment of the gas engine replacement device 10. In some embodiments, the electronic processor 302 stores a PWM parameter upper limit in the memory 306 that is determined based on the maximum discharge current. The electronic processor 302 may control the operation of the gas engine replacement device 10 based on the PWM parameter upper limit without continuous monitoring the current drawn from the battery pack 50. In some embodiments, the electronic processor 302 may continuously monitor the current drawn from the battery pack 50, compare the current measured to the maximum discharge current, and reduce the PWM parameter, such as the duty cycle of the signals driving the power switching network 310, in response to the current exceeding the maximum discharge current.

In some embodiments, the control algorithm used by the electronic processor 302 in the gas engine replacement device 10 may employ predetermined operating parameters, such as a PWM parameter upper limit, that are defined as a function of the battery pack configuration data, such as cell size, cell maximum temperature, maximum discharge current, discharge state, and the like. For example, a look-up table mapping various battery pack configuration data to associated PWM limits may be employed.

In some embodiments, the method 400 ends at block 412 and the remaining steps are not executed. In other embodiments, the method proceeds to block 415.

At block 415, the electronic processor 336 in the battery pack 50 monitors the battery pack condition. In some embodiments, the battery pack condition includes a temperature parameter. In some embodiments, the battery pack condition includes a capacity rate of change of the battery pack or power usage by the gas engine replacement device 10. The maximum discharge current associated with the battery pack 50 is generally set based on certain assumptions regarding the thermal conditions of the battery pack 50 during operations, such as the air flow design for cooling the battery pack 50. Under certain conditions, the cooling may be compromised, or the ambient temperature may be increased such that the actual operating conditions differ from the assumptions. As a result, the temperature of the battery pack 50 may approach a fault threshold even if the maximum discharge current is not exceeded by the gas engine replacement device 10. In some embodiments, the maximum discharge current may be set based on an assumed discharge rate for the battery pack 50. For example, the battery pack 50 may be assumed to be able to deliver power at the maximum discharge current for a known time period, thereby defining a discharge rate. The actual rate that the battery charge discharges may differ based on conditions, such as the temperature or other factors. In some embodiments, the electronic processor 336 in the battery pack 50 monitors the battery pack discharge rate as the battery pack condition.

The electronic processor 336 in the battery pack 50 determines whether a condition of the battery pack 50 violates a threshold at block 420. For example, a temperature of the battery pack 50 measured by the battery sensors 341 may exceed a threshold, or the battery pack depletion rate may exceed a threshold. In some embodiments, the threshold is set at a level less than a fault threshold that would result in a power interruption.

If the threshold is violated at block 420, the electronic processor 336 in the battery pack 50 revises the battery pack configuration data. For example, the maximum discharge current of the battery pack 50 may be reduced. In an embodiment where the electronic processor 336 in the battery pack 50 is omitted, the electronic processor 302 in the gas engine replacement device 10 may receive data from the battery sensor 341, determine whether the condition of the battery pack 50 violates the threshold at block 420, and revise the battery pack configuration data.

The revised battery pack configuration data is communicated to the gas engine replacement device 10 at block 425. In some embodiments, the electronic processor 336 in the battery pack 50 pushes the revised battery pack configuration data to the electronic processor 302 in the gas engine replacement device 10. In some embodiments, the electronic processor 302 in the gas engine replacement device 10 polls the battery pack 50 at regular intervals or between operating cycles to identify any changes to the battery pack configuration data. In an embodiment where the electronic processor 336 in the battery pack 50 is omitted, the electronic processor 302 revises the battery pack configuration data.

In some embodiments, upon receiving the revised battery pack configuration data, the electronic processor 302 stores the revised battery pack configuration data (e.g., updated or overwriting the previous battery pack configuration data) in the memory 306, and thereby revising its control algorithm. For example, a revised maximum discharge current may be stored in the memory 306. In some embodiments, the PWM initialization routing described above may be repeated to generate a new PWM limit or the look-up table may be accessed based on the revised battery pack configuration data. At a later point in time, such as after a temperature of the battery pack 50 has been reduced to a lower level, the electronic processor 336 in the battery pack 50 may again revise the battery pack configuration data to increase the maximum discharge current. In this manner, the maximum discharge current associated with the battery pack 50 may be dynamically controlled based on the actual operating environment of the gas engine replacement device 10.

The method then returns to block 412, where the electronic processor 302 operates the motor according to the battery pack configuration data as revised at block 425 (i.e., according to the revised battery pack configuration data).

The mechanical systems described above driven by the gas engine replacement device 10 includes many advantages over conventional equipment driven by an internal combustion engine, some of which are discussed below.

In some embodiments, the gas engine replacement device 10 can be mated with a new equipment and the memory 306 can be reprogrammed to optimize the gas engine replacement device 10 for operation with the new equipment. In some embodiments, the electronic processor 302 automatically recognizes which type of new equipment the gas engine replacement device 10 has been mated with, and governs operation of the gas engine replacement device 10 accordingly. In some embodiments, the electronic processor 302 can automatically detect with which equipment the gas engine replacement device 10 has been mated via Radio Frequency Identification (RFID) communication with the new equipment.

In some embodiments, the memory 306 is reprogrammable via either BLUETOOTH or Wi-Fi communication protocols. In some embodiments, the electronic processor 302 has control modes for different uses of the same equipment. The control modes may be preset or user-programmable, and may be programmed remotely via BLUETOOTH or Wi-Fi. In some embodiments, the electronic processor 302 utilizes master/slave equipment-to-equipment communication and coordination, such that the gas engine replacement device 10 can exert unidirectional control over equipment, or an operator can use a smartphone application to exert unidirectional control over the gas engine replacement device 10.

In some embodiments, the operator or original equipment manufacturer (OEM) is allowed limited access to control the speed of the gas engine replacement device 10 through the electronic processor 302 via, e.g., a controller area network (CAN)-like interface. In some embodiments, the electronic processor 302 is capable of a wider range of speed selection with a single gear set in the gear train 110 than a gasoline engine. For example, the control electronics 42 are configured to drive the motor 36 at less than 2,000 RPM, which is lower than any speed a gasoline engine is capable of, which permits the associated equipment to have a greater overall runtime over a full discharge of the battery pack 50, than a gasoline engine. Additionally the control electronics 42 are configured to drive the motor at more than 3,600 RPM, which is higher than any speed a gasoline engine is capable of, and with the capability to deliver more torque. The wider range of speeds of motor 36 offers greater efficiency and capability than a gasoline engine. In some embodiments, the operator could have access to control the current drawn by the motor 36 in addition to the speed.

In some embodiments, the electronic processor 302 is configured to log and report data. For example, the electronic processor 302 is configured to provide wired or wireless diagnostics for monitoring and reading the status of the gas engine replacement device 10. For example, the electronic processor 302 can monitor and log gas engine replacement device 10 runtime for example, in a rental scenario. In some embodiments, the motor 36 and the electronic processor 302 use regenerative braking to charge the battery pack 50. In some embodiments, the gas engine replacement device 10 includes a DC output for lights or accessories. In some embodiments, the electronic processor 302 can detect anomalies or malfunctions of the gas engine replacement device 10 via voltage, current, motion, speed, and/or thermocouples. In some embodiments, the electronic processor 302 can detect unintended use of or stoppage of the gas engine replacement device 10. If the equipment driven by the gas engine replacement device 10 is not running with the intended characteristics or is not being used correctly or safely, the electronic processor 302 can detect the anomaly and deactivate the gas engine replacement device 10. For example, the gas engine replacement device 10 can include one or more accelerometers to sense if the gas engine replacement device 10 and equipment is in the intended orientation. And, if the electronic processor 302 determines that the gas engine replacement device 10 is not in the intended orientation (i.e. the equipment has fallen over), the electronic processor 302 can deactivate the gas engine replacement device 10.

In some embodiments, the gas engine replacement device 10 includes accessible sensor ports (not shown) to electrically connect with user-selected sensors for use with the piece of power equipment, such as accelerometers, gyroscopes, GPS units, or real time clocks, allowing an operator to customize the variables to be sensed and detected by the electronic processor 302. In some embodiments, the electronic processor 302 can indicate the status of the battery pack 50, such as when the battery is running low, to an operator via visual, audio, or tactile notifications. In some embodiments, the electronic processor 302 can operate an auxiliary motor that is separate from the motor 36 to drive an auxiliary device such as a winch. The auxiliary motor may be internal or external to the gas engine replacement device 10.

In some embodiments, the gas engine replacement device 10 can include digital controls on a customizable user interface, such as a touch display or a combination of knobs and buttons. In contrast, an analog gasoline engine does not include such digital controls. In some embodiments, the user interface for the gas engine replacement device 10 can be modular, wired, or wireless and can be attachable to the gas engine replacement device 10 or be hand held. In some embodiments, the gas engine replacement device 10 can be controlled with a remote control that includes status indicators for certain characteristics of the gas engine replacement device 10, such as charge of the battery pack 50 and the temperature. In some embodiments, the gas engine replacement device 10 can provide status indications with a remote, programmable device.

Figure 11:
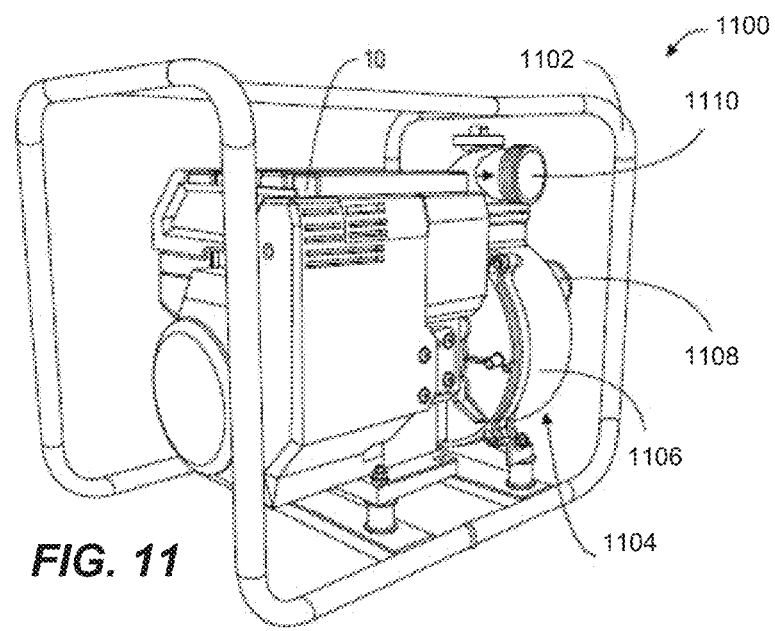
FIG. 11 illustrates a pump system including the gas engine replacement device of FIG. 1.
Figure 12:
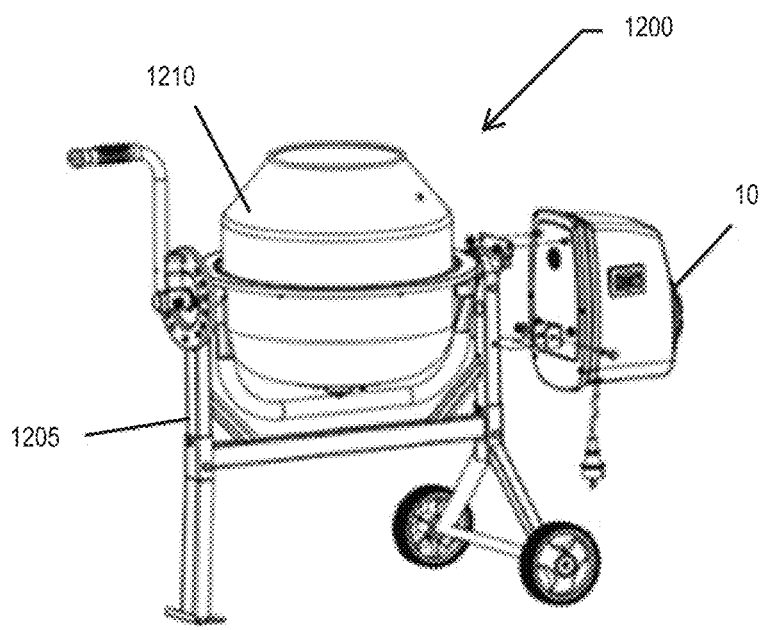
FIG. 12 illustrates a mixing system including the gas engine replacement device of FIG. 1.

FIGS. 11 and 12 illustrates examples of power equipment driven by the gas engine replacement device 10 implementing the method 400 described above. FIG. 11 illustrates a pump system 1100 including a frame 1102 supporting the gas engine replacement device 10 and a pump 1104 with the gas engine replacement device 10 operable to drive the pump 1104. The illustrated pump 1104 is a centrifugal pump having an impeller positioned within a housing 1106 of the pump 1104 that is rotatable about an axis to move material from an inlet 1108 of the pump 1104 to an outlet 1110 of the pump 1104. FIG. 12 illustrates a mixing system 1200 including a frame 1205 supporting the gas engine replacement device 10 and a mixing drum 1210, with the gas engine replacement device 10 operable to rotate the mixing drum 1210.

We claim:

1. A gas engine replacement device, comprising:
   a housing;

a battery receptacle coupled to the housing and configured to removably connect to a battery pack including a first electronic processor and a memory storing battery pack configuration data;
a motor located within the housing;
a power take-off shaft receiving torque from the motor and protruding from a side of the housing;
a power switching network configured to selectively provide power from the battery pack to the motor; and
a second electronic processor connected to the power switching network and configured to control the power switching network to rotate the motor,
wherein at least one of the first and second electronic processors is configured to detect a connection of the battery pack to the battery receptacle and the first electronic processor is configured to revise the battery pack configuration data stored in the memory in response to detecting a condition and communicate the revised battery pack configuration data to the second electronic processor, and
wherein the second electronic processor is configured to control the motor based on the revised battery pack configuration data.

2. The gas engine replacement device of claim 1, wherein: the revised battery pack configuration data includes a maximum discharge current, and the second electronic processor is configured to control a pulse width modulation parameter used in controlling the power switching network based on the maximum discharge current.

3. The gas engine replacement device of claim 2, wherein: the second electronic processor is configured to:
generate an upper limit for the pulse width modulation parameter based on the maximum discharge current; and
control the power switching network based on the upper limit for the pulse width modulation parameter.

4. The gas engine replacement device of claim 3, further comprising:
a current sensor configured to measure a current parameter, wherein the current parameter includes at least one of a battery current or a motor current, and
the second electronic processor is configured to control the pulse width modulation parameter used in controlling the power switching network based on the current parameter and the maximum discharge current.

5. The gas engine replacement device of claim 1, wherein the condition includes violation of a threshold associated with the battery pack.

6. The gas engine replacement device of claim 5, wherein the violation of the threshold includes violation of a temperature threshold.

7. The gas engine replacement device of claim 5, wherein the violation of the threshold includes violation of a depletion rate threshold.

8. The gas engine replacement device of claim 1, wherein the first electronic processor is configured to communicate the revised battery pack configuration data to the second electronic processor wirelessly.

9. The gas engine replacement device of claim 1, wherein the first electronic processor is configured to communicate the revised battery pack configuration data to the second electronic processor through an external device.

10. A method for operating a gas engine replacement device including
a housing,
a battery receptacle coupled to the housing and configured to removably connect to a battery pack having a memory storing battery pack configuration data and
a first electronic processor,
a motor located within the housing,
a power take-off shaft receiving torque from the motor and protruding from a side of the housing, a power switching network configured to selectively provide power from the battery pack to the motor,
and a second electronic processor connected to the power switching network and configured to control the power switching network to rotate the motor, the method comprising:
revising, by the first electronic processor, the battery pack configuration data stored in the memory in response to detecting a condition; and
communicating the revised battery pack configuration data to the second electronic processor for use in controlling the power switching network, the revised battery pack configuration data including discharge parameters of the battery pack.

11. The method of claim 10, wherein communicating the revised battery pack configuration data includes communicating, by the first electronic processor, the revised battery pack configuration data to the second electronic processor.

12. The method of claim 11, wherein communicating, by the first electronic processor, the revised battery pack configuration data to the second electronic processor includes communicating the revised battery pack configuration data wirelessly.

13. The method of claim 11, wherein communicating, by the first electronic processor, the revised battery pack configuration data to the second electronic processor includes communicating the revised battery pack configuration data through an external device.

14. The method of claim 10, wherein communicating the revised battery pack configuration data includes reading, by the second electronic processor, the revised battery pack configuration data from the memory.

15. The method of claim 10, wherein the revised battery pack configuration data includes a maximum discharge current.

16. A battery pack, comprising:
a battery pack housing including a support portion including an arrangement cooperating with a complementary arrangement of a battery receptable on a gas engine replacement housing;
a first electronic processor; and
a memory,
the first electronic processor configured to:
communicate first battery pack configuration data stored in the memory to a second electronic processor of a gas engine replacement device electrically coupled with the battery pack, and
communicate second battery pack configuration data to a third electronic processor of a second device electrically coupled with the battery pack,
the second battery pack configuration data being different than the first battery pack configuration data and defining a discharge parameter of the battery pack.

17. The battery pack of claim 16, wherein at least one of the first battery pack configuration data and the second battery pack configuration data includes a maximum discharge rate.

18. The battery pack of claim 16, wherein the discharge parameter defined by the second battery pack configuration data modifies a discharge parameter defined by the first battery pack configuration data based on a condition associated with the second device detected via the first electronic processor.

19. The battery pack of claim 16, wherein the first electronic processor is configured to communicate at least one of the first battery pack configuration data and the second battery pack configuration data wirelessly.

20. The battery pack of claim 16, wherein the first electronic processor is configured to communicate at least one of the first battery pack configuration data and the second battery pack configuration data wirelessly.

\* \* \* \* \*